US011442350B2

(12) United States Patent
Chou et al.

(10) Patent No.: US 11,442,350 B2
(45) Date of Patent: Sep. 13, 2022

(54) PROJECTOR RECOMMENDATION METHOD AND PROJECTOR RECOMMENDATION SYSTEM

(71) Applicants: BenQ Intelligent Technology (Shanghai) Co., Ltd, Shanghai (CN); BENQ CORPORATION, Taipei (TW)

(72) Inventors: Tung-Chia Chou, New Taipei (TW); I-Jan Cheng, New Taipei (TW)

(73) Assignees: BenQ Intelligent Technology (Shanghai) Co., Ltd; BENQ CORPORATION, Taipei (TW)

( * ) Notice: Subject to any disclaimer, the term of this patent is extended or adjusted under 35 U.S.C. 154(b) by 0 days.

(21) Appl. No.: 16/880,932

(22) Filed: May 21, 2020

(65) Prior Publication Data
US 2021/0223673 A1     Jul. 22, 2021

(30) Foreign Application Priority Data
Jan. 22, 2020     (TW) .................................. 109102390

(51) Int. Cl.
*G03B 21/20* (2006.01)
*G03B 21/14* (2006.01)
*G03B 21/46* (2006.01)
*G06F 16/901* (2019.01)
*G09G 5/391* (2006.01)

(52) U.S. Cl.
CPC ....... *G03B 21/2053* (2013.01); *G03B 21/142* (2013.01); *G03B 21/2046* (2013.01); *G03B 21/46* (2013.01); *G06F 16/9017* (2019.01); *G09G 5/391* (2013.01)

(58) Field of Classification Search
CPC .............. G03B 21/2053; G03B 21/142; G03B 21/2046; G03B 21/46; G06F 16/9017; G09G 5/391
See application file for complete search history.

(56) References Cited

U.S. PATENT DOCUMENTS 6,305,805 B1 * 10/2001 Liebenow ................ H04N 5/74
                                                                353/69
7,472,998 B2    1/2009 Sasazaki
(Continued)

FOREIGN PATENT DOCUMENTS

CN        106537815 A      3/2017
TW        200639769       11/2006

*Primary Examiner* — Magda Cruz
(74) *Attorney, Agent, or Firm* — Winston Hsu (57) ABSTRACT

A projector recommendation method includes steps of providing a look-up table, wherein the look-up table records a plurality of projectors and a plurality of projection parameters corresponding to each of the projectors; inputting a size of a projection plane, a projection distance and an environmental brightness; calculating a projection length according to the size of the projection plane, a target aspect ratio and a blending manner, calculating a target throw ratio according to the projection distance and the projection length, and calculating a target minimum projection brightness according to the environmental brightness, a predetermined brightness level and a projection area; and generating a projector recommendation result according to the target minimum projection brightness, the target throw ratio, a target resolution corresponding to the target aspect ratio and the projection parameters.

14 Claims, 4 Drawing Sheets

(56) References Cited

U.S. PATENT DOCUMENTS

| | | | |
|---|---|---|---|
| 10,142,020 B2 | 11/2018 | Aoyama | |
| 2008/0204663 A1* | 8/2008 | Balogh | H04N 13/363 353/121 |
| 2008/0259223 A1* | 10/2008 | Read | H04N 9/3147 348/745 |
| 2009/0213337 A1* | 8/2009 | Kondo | H04N 9/3147 353/30 |
| 2010/0185970 A1* | 7/2010 | Benenson | G06F 3/0482 715/772 |
| 2011/0176119 A1* | 7/2011 | Jung | H04N 9/3194 353/79 |
| 2012/0229589 A1* | 9/2012 | Barrus | H04N 7/147 348/14.08 |
| 2013/0162671 A1* | 6/2013 | Fujita | G09G 5/377 345/589 |
| 2013/0169888 A1* | 7/2013 | Tannhauser | H04N 9/3188 348/745 |
| 2013/0222386 A1* | 8/2013 | Tannhauser | G06T 3/4038 345/428 |
| 2013/0229396 A1* | 9/2013 | Huebner | H04N 9/3173 345/207 |
| 2016/0321779 A1* | 11/2016 | Fujita | H04N 21/845 |
| 2017/0214895 A1* | 7/2017 | Fujioka | H04N 9/3147 |
| 2017/0289508 A1* | 10/2017 | Fujioka | H04N 9/3105 |
| 2017/0322714 A1* | 11/2017 | Sato | H04N 21/485 |
| 2018/0005606 A1* | 1/2018 | Mori | G06F 3/1446 |
| 2018/0115797 A1 | 4/2018 | Wexler | |
| 2019/0116356 A1* | 4/2019 | Matoba | H04N 9/3102 |
| 2019/0124307 A1* | 4/2019 | Oike | H04N 9/3194 |

\* cited by examiner

| Size of projection plane | | |
|---|---|---|
| Width of projection plane (m) | 6.4 | |
| Height of projection plane (m) | 2 | |
| Projection distance (m) | 3 | |
| Environmental brightness (lux) | User setting | Low environmental brightness |
| | | Moderate environmental brightness |
| | | High environmental brightness |
| | | User setting |

One layer side-by-side
landscape projection blending

One layer side-by-side
portrait projection blending

Two layers side-by-side
landscape projection blending

Two layers side-by-side
portrait projection blending

FIG. 4

Projector recommendation list

One layer side-by-side landscape projection blending

Projector P4: 2 units

Two layers side-by-side portrait projection blending

Projector P6 (Lens L1): 22 units

FIG. 5

| Look-up table 100 ||||| 
|---|---|---|---|---|
| Projector | Related information |||| 
| | Portrait projection | Image blending | End of life | Lens |
| P1 | No | No | No | Fixed lens |
| P2 | No | Yes | No | Fixed lens |
| P3 | No | Yes | No | Fixed lens |
| P4 | No | Yes | No | Fixed lens |
| P5 | No | Yes | No | Fixed lens |
| P6 | Yes | Yes | No | L1 |
| | | | | L2 |
| | | | | L3 |
| Projector | Projection parameters |||| 
| | Throw ratio | Resolution | Aspect ratio | Minimum projection brightness (lumen) |
| P1 | 1.38-2.13 | 1080p | 16:9 | 5000 |
| P2 | 1.36-2.18 | 1080p | 16:9 | 5000 |
| P3 | 1.36-2.18 | 4K | 16:9 | 5000 |
| P4 | 0.81-0.89 | 4K | 16:9 | 6500 |
| P5 | 1.36-2.18 | WUXGA | 16:10 | 5000 |
| P6 (L1) | 2.22-3.67 | WUXGA | 16:10 | 10000 |
| P6 (L2) | 3.58-5.38 | WUXGA | 16:10 | |
| P6 (L3) | 5.31-8.26 | WUXGA | 16:10 | |

FIG. 6

PROJECTOR RECOMMENDATION METHOD AND PROJECTOR RECOMMENDATION SYSTEM

BACKGROUND OF THE INVENTION

1. Field of the Invention

The invention relates to a projector recommendation method and a projector recommendation system and, more particularly, to a projector recommendation method and a projector recommendation system capable of recommending projector automatically according to projection requirement.

2. Description of the Prior Art

Recently, projectors are getting more and more popular. With the capacity of video playing, projectors are applied not only for common office meetings, but also for various seminars or academic courses. When a user wants to install a projector at a site, the user may only provide some information including a size of the site, a size of a projection plane, a predetermined position for installing the projector, and so on for a system provider. Since there are various projectors on the market, it is very difficult for the system provider to recommend an appropriate projector for the user according to the aforesaid information provided by the user.

SUMMARY OF THE INVENTION

The invention provides a projector recommendation method and a projector recommendation system capable of recommending projector automatically according to projection requirement, so as to solve the aforesaid problems.

According to an embodiment of the invention, a projector recommendation method comprises steps of providing a look-up table, wherein the look-up table records a plurality of projectors and a plurality of projection parameters corresponding to each of the projectors; inputting a size of a projection plane, a projection distance and an environmental brightness; calculating a projection length according to the size of the projection plane, a target aspect ratio and a blending manner, calculating a target throw ratio according to the projection distance and the projection length, and calculating a target minimum projection brightness according to the environmental brightness, a predetermined brightness level and a projection area; and generating a projector recommendation result according to the target minimum projection brightness, the target throw ratio, a target resolution corresponding to the target aspect ratio and the projection parameters.

According to another embodiment of the invention, a projector recommendation system comprises a database, an input interface, a processing unit and a display unit. The database stores a look-up table, wherein the look-up table records a plurality of projectors and a plurality of projection parameters corresponding to each of the projectors. The input interface is configured to input a size of a projection plane, a projection distance and an environmental brightness. The processing unit calculates a projection length according to the size of the projection plane, a target aspect ratio and a blending manner, calculates a target throw ratio according to the projection distance and the projection length, and calculates a target minimum projection brightness according to the environmental brightness, a predetermined brightness level and a projection area. The processing unit generates a projector recommendation result according to the target minimum projection brightness, the target throw ratio, a target resolution corresponding to the target aspect ratio and the projection parameters. The display unit is configured to display the projector recommendation result.

As mentioned in the above, when a user wants to install a projector at a site, the user needs to input the size of the projection plane, the projection distance and the environmental brightness. Then, the invention will generate the corresponding projector recommendation result automatically. When there is/are projector(s) in the database satisfying the projection requirement, the invention may generate a projector recommendation list including at least one candidate projector for the user. Accordingly, the user may find a projector satisfying the projection requirement rapidly through the projector recommendation list. On the other hand, when there is no projector in the database satisfying the projection requirement, the invention may generate a notice message to notice the user that there is no projector satisfying the projection requirement. At this time, the user may adjust the projection requirement according to the notice message or a system administrator may add other projector(s) into the database, such that the projector recommendation system may recommend an appropriate projector again. Accordingly, the invention can improve the installation of projector more efficient and more convenient.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
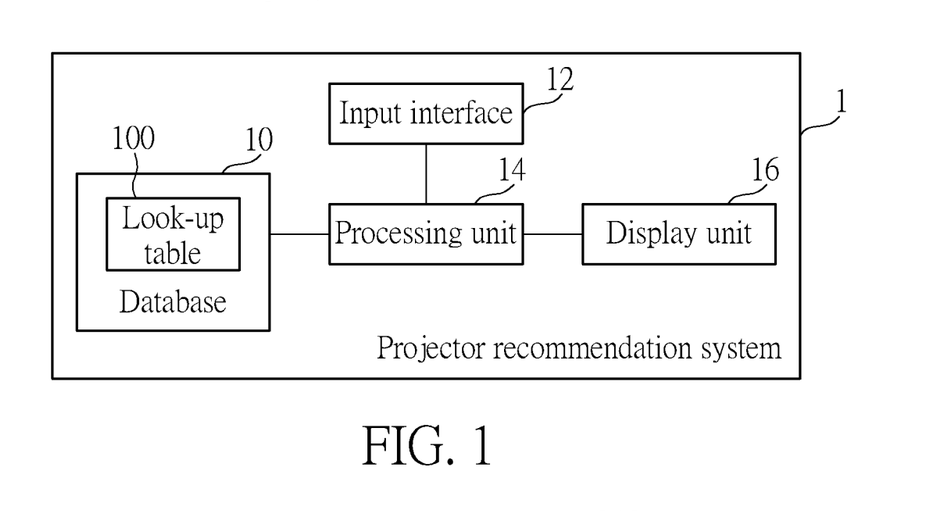
FIG. 1 is a functional block diagram illustrating a projector recommendation system according to an embodiment of the invention.
Figure 2:
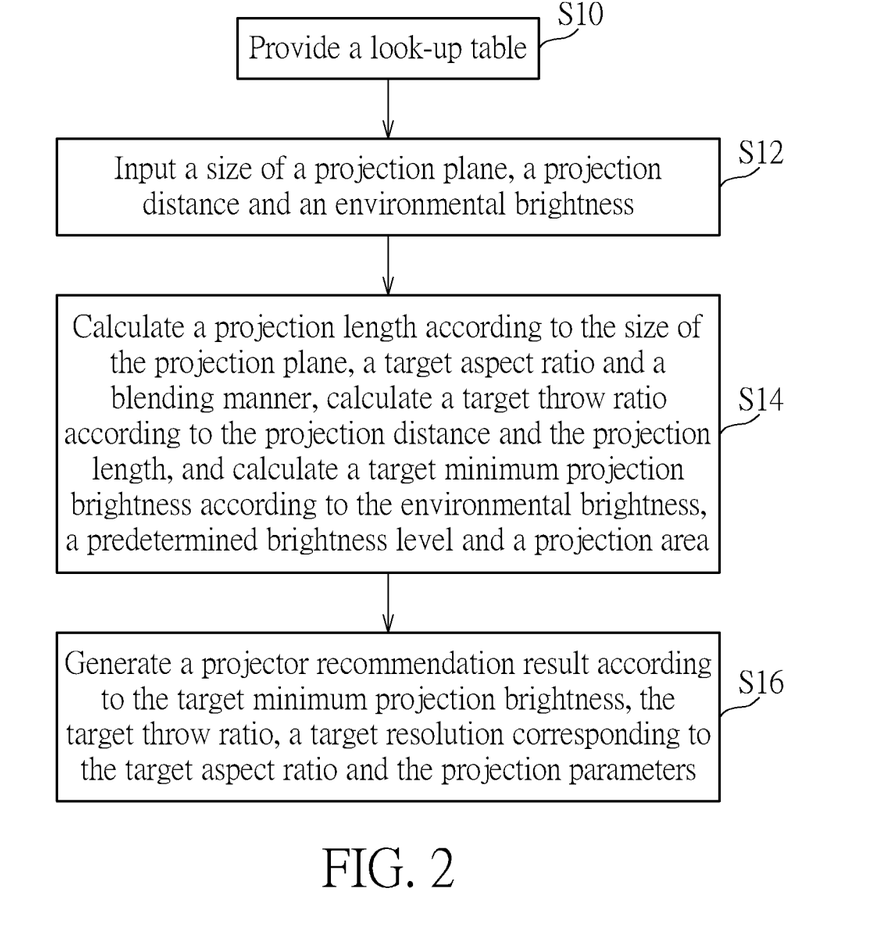
FIG. 2 is a flowchart illustrating a projector recommendation method according to an embodiment of the invention.
Figure 3:
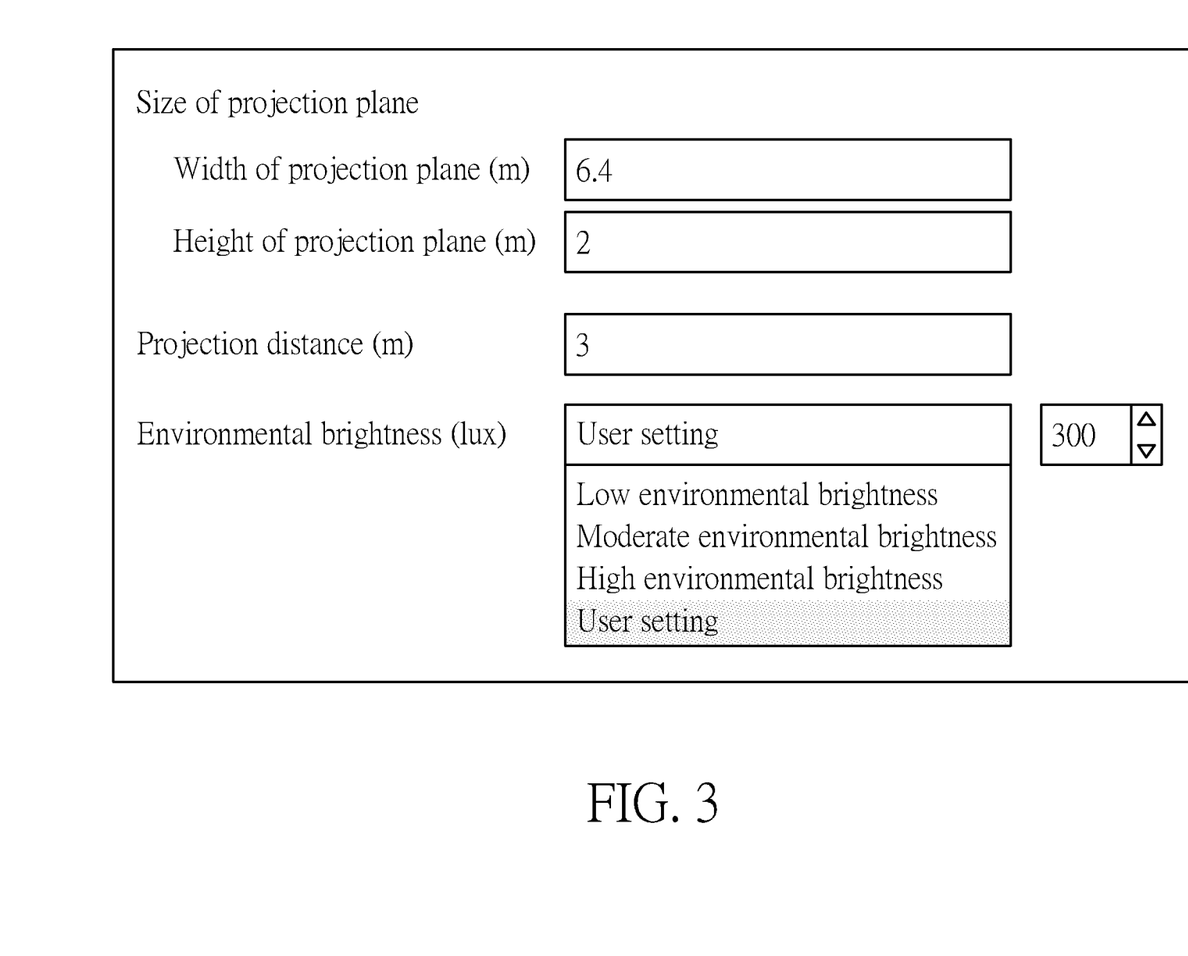
FIG. 3 is a schematic view illustrating the input interface shown in FIG. 1.
Figure 4:
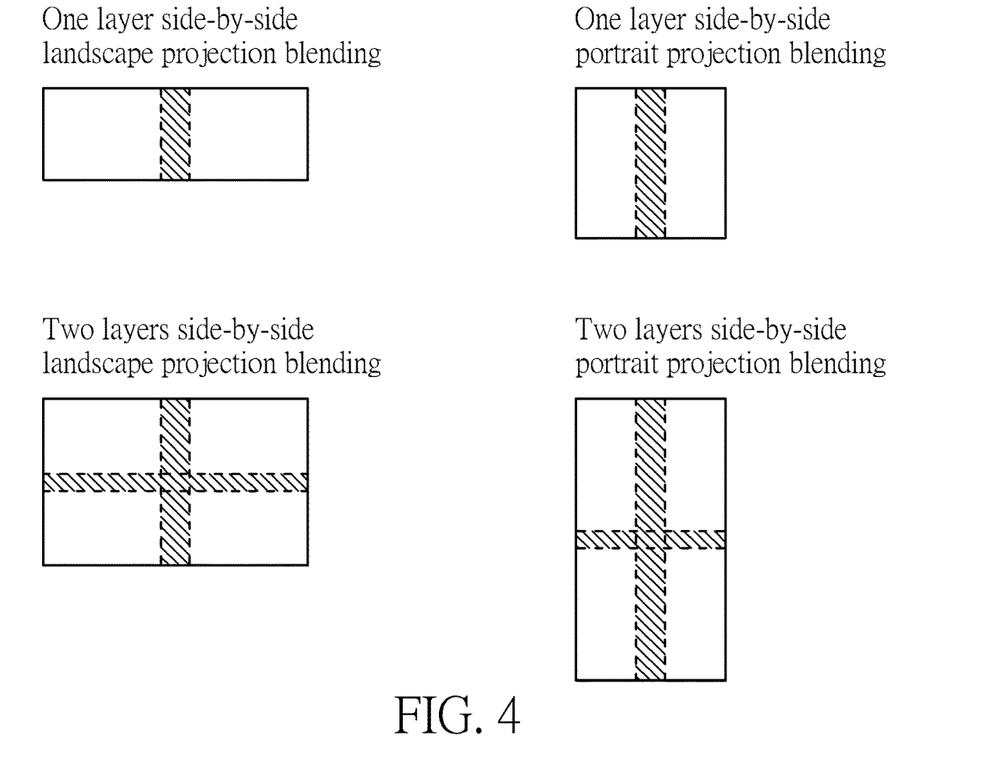
FIG. 4 is a schematic view illustrating four blending manners.
Figure 5:
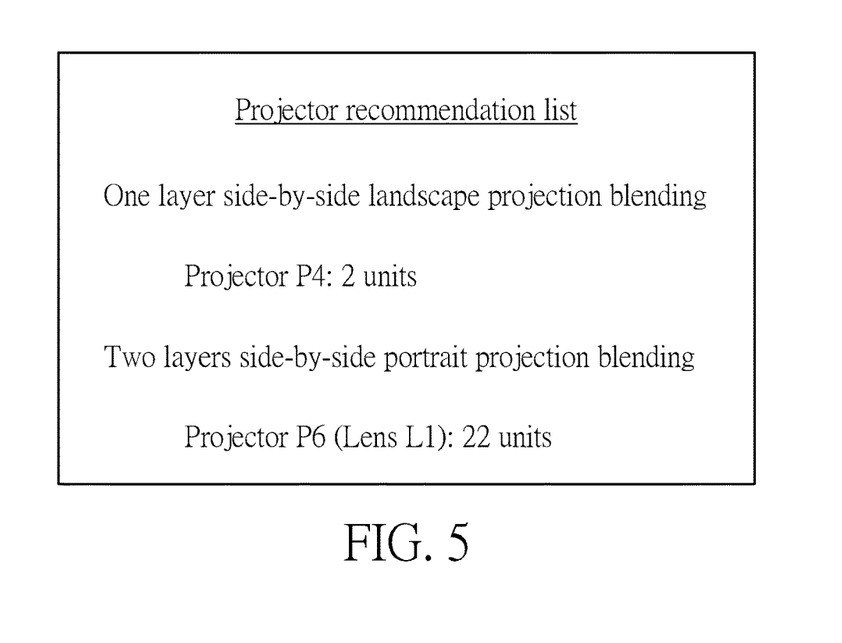
FIG. 5 is a schematic view illustrating a projector recommendation list.

Referring to FIGS. 1 to 5, FIG. 1 is a functional block diagram illustrating a projector recommendation system 1 according to an embodiment of the invention, FIG. 2 is a flowchart illustrating a projector recommendation method according to an embodiment of the invention, FIG. 3 is a schematic view illustrating the input interface 12 shown in FIG. 1, FIG. 4 is a schematic view illustrating four blending manners, and FIG. 5 is a schematic view illustrating a projector recommendation list. The projector recommendation method shown in FIG. 2 is adapted to the projector recommendation system 1 shown in FIG. 1.

As shown in FIG. 1, the projector recommendation system 1 comprises a database 10, an input interface 12, a processing unit 14 and a display unit 16. In practical applications, the database 10 and the processing unit 14 may be provided by a server and the display unit 16 may be provided by a user device (e.g. computer), wherein the server and the user device may communicate with each other by a wireless or wired manner. It should be noted that the wireless or wired communication is well known by one skilled in the art, so the explanation will not be depicted herein. The input interface 12 may be provided by an application installed in the server and/or the user device, wherein the input interface 12 may be displayed by the display unit 16. In this embodiment, the processing unit 14 may be a processor or a controller with signal processing/calculating function and the display unit 16 may be a liquid crystal display or other displays.

Figure 6:
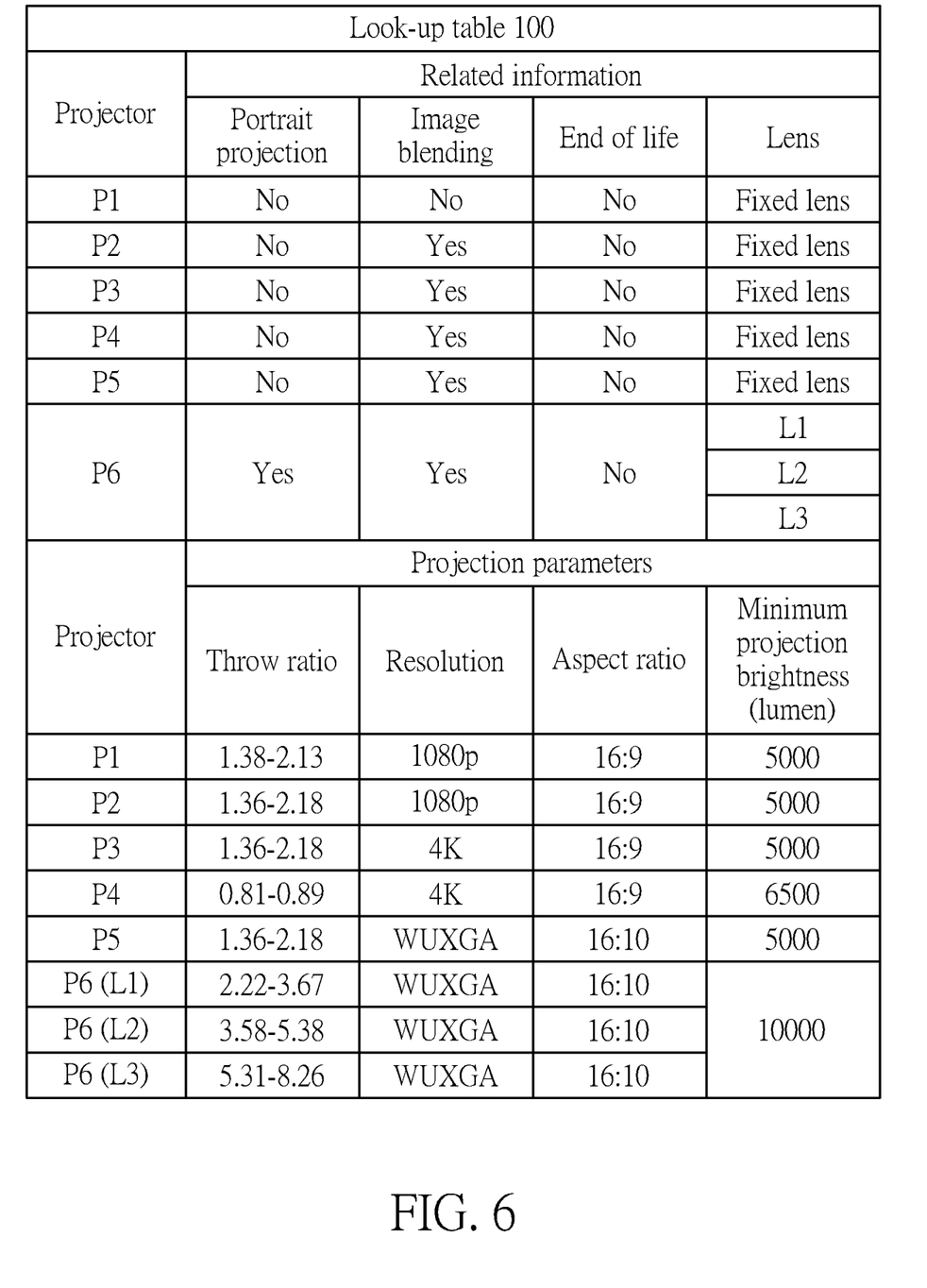
FIG. 6 is a diagram of a look-up table according to an embodiment of the present application.

The projector recommendation method of the invention provides a look-up table 100 first (step S10 in FIG. 2). The database 10 is configured to store the look-up table 100. As shown in table 1 below and FIG. 6, the look-up table 100 records a plurality of projectors P1-P6 and a plurality of projection parameters corresponding to each of the projectors P1-P6. In this embodiment, the projection parameters may comprise a throw ratio, a resolution, an aspect ratio and a minimum projection brightness of each of the projectors P1-P6. Furthermore, at least one of the projectors P1-P6 may comprise a plurality of lenses and the look-up table 100 may record the throw ratio of each of the lenses. As shown in table 1 below and FIG. 6, the projector P6 comprises three lenses L1-L3 and the look-up table 100 records the throw ratio of each of the lenses L1-L3. Still further, the look-up table 100 may further record some related information of each of the projectors P1-P6, such as, but not limited to, portrait projection, image blending, end of life, lens, and so on, as shown in table 1. It should be noted that the number of projectors, the number of lenses, the related information and the projection parameters recorded in the look-up table 100 may be determined according to practical applications, so the invention is not limited to the embodiment shown in table 1.

TABLE 1

Look-up table 100

| | Related information | | | |
|---|---|---|---|---|
| Projector | Portrait projection | Image blending | End of life | Lens |
| P1 | No | No | No | Fixed lens |
| P2 | No | Yes | No | Fixed lens |
| P3 | No | Yes | No | Fixed lens |
| P4 | No | Yes | No | Fixed lens |
| P5 | No | Yes | No | Fixed lens |
| P6 | Yes | Yes | No | L1 |
| | | | | L2 |
| | | | | L3 |

| | Projection parameters | | | |
|---|---|---|---|---|
| Projector | Throw ratio | Resolution | Aspect ratio | Minimum projection brightness (lumen) |
| P1 | 1.38-2.13 | 1080p | 16:9 | 5000 |
| P2 | 1.36-2.18 | 1080p | 16:9 | 5000 |
| P3 | 1.36-2.18 | 4K | 16:9 | 5000 |
| P4 | 0.81-0.89 | 4K | 16:9 | 6500 |
| P5 | 1.36-2.18 | WUXGA | 16:10 | 5000 |
| P6 (L1) | 2.22-3.67 | WUXGA | 16:10 | 10000 |
| P6 (L2) | 3.58-5.38 | WUXGA | 16:10 | |
| P6 (L3) | 5.31-8.26 | WUXGA | 16:10 | |

When a user wants to use the projector recommendation system 1 to recommend a projector adapted to be installed at a site, the user needs to operate the user device to display the input interface 12 on the display unit 16. As shown in FIG. 3, the input interface 12 is configured to input a size of a projection plane, a projection distance and an environmental brightness by the user (step S12 in FIG. 2). The size of the projection plane may comprise a width of the projection plane and a height of the projection plane. In this embodiment, the environmental brightness may be set by the user. In addition to user setting, the input interface 12 may further provide a plurality of preset environmental brightness for the user to select. As shown in FIG. 3, the input interface 12 may provide a low environmental brightness (e.g. museum), a moderate environmental brightness (e.g. classroom) and a high environmental brightness (e.g. shopping mall), but is not so limited. For example, the low environmental brightness may be preset by 150 lux, the moderate environmental brightness may be preset by 250 lux, and the high environmental brightness may be preset by 350 lux.

In this embodiment, it is assumed that the width of the projection plane is 6.4 m, the height of the projection plane is 2 m, the projection distance is 3 m, and the environmental brightness is 300 lux. After inputting the size of the projection plane, the projection distance and the environmental brightness, the processing unit 14 calculates a projection length according to the size of the projection plane, a target aspect ratio and a blending manner, calculates a target throw ratio according to the projection distance and the projection length, and calculates a target minimum projection brightness according to the environmental brightness, a predetermined brightness level and a projection area (step S14 in FIG. 2). Furthermore, the processing unit 14 may further calculate a number of projectors corresponding to the target resolution according to the size of the projection plane, the target aspect ratio, the blending manner and at least one minimum overlapping level.

In this embodiment, the blending manner may be at least one layer side-by-side landscape projection blending or at least one layer side-by-side portrait projection blending. As shown in FIG. 4, the invention may preset four blending manners, wherein the slash area is an overlapping area between two adjacent projection images. It should be noted that the blending manner may be determined according to practical applications, so the invention is not limited to the embodiment shown in the figure. In the following, the invention depicts how to perform the step S14 in FIG. 2 by "one layer side-by-side landscape projection blending" and "two layers side-by-side portrait projection blending", for example. It should be noted that the numbers below are represented after rounding real numbers. Accordingly, if the numbers below are used to perform related calculation, a little difference may occur.

One Layer Side-by-Side Landscape Projection Blending: In the following, a projector with a target resolution XGA (i.e. target resolution is 1024*768 and aspect ratio is 4:3) is exemplified. First, the processing unit 14 sets a height of a projection image of one projector to be equal to the height (i.e. 2 m) of the projection plane and then blends a plurality of projectors according to the width (i.e. 6.4 m) of the projection plane. In this embodiment, the invention may preset a minimum overlapping level between two adjacent projection images in horizontal direction to be 10%. In other words, an overlapping ratio between two adjacent projection images in horizontal direction cannot be smaller than the minimum overlapping level 10%. It should be noted that the minimum overlapping level in horizontal direction may be a system default or set by the user according to practical applications. Accordingly, when the height of the projection plane is 2 m and the target aspect ratio is 4:3, the width of the projection image of one projector is 2.67 m, wherein the width of the projection image of one projector is the aforesaid projection length. When the width of the projection plane is 6.4 m, the number of projectors required by "one layer side-by-side landscape projection blending" is 3. At this time, the overlapping ratio between two adjacent projection images in horizontal direction is 30% (i.e. 3*2.67 m−2.67 m*30%*2=6.4 m). Furthermore, the target throw ratio is a ratio of the projection distance (i.e. 3 m) to the width of the projection image of one projector (i.e. the aforesaid projection length 2.67 m). Accordingly, the target throw ratio is 1.13. In this embodiment, the predetermined brightness level may be 3 times the environmental brightness. It should be noted that the predetermined brightness level may be a system default or set by the user according to practical applications. Accordingly, the target minimum projection brightness may be a product of 3 times the environmental brightness (i.e. 300 lux*3) and a projection area of one projector (i.e. 2 m*2.67 m=5.333 $m^2$), i.e. the target minimum projection brightness is 4800 lumen (i.e. 900 lux*5.333 $m^2$=4800 lumen).

When the target resolution is WUXGA (i.e. target resolution is 1920*1200 and aspect ratio is 16:10), WXGA (i.e. target resolution is 1280*800 and aspect ratio is 16:10), 4K (i.e. target resolution is 3840*2160 and aspect ratio is 16:9), or 1080p (i.e. target resolution is 1920*1080 and aspect ratio is 16:9), the processing unit 14 may also calculate the width of the projection image of one projector, the number of projectors, the overlapping ratio between two adjacent projection images in horizontal direction, the target throw ratio and the target minimum projection brightness correspondingly according to the aforesaid manner. As shown in table 2 below, table 2 records a plurality of calculation results corresponding to different target resolutions.

20%. In other words, an overlapping ratio between two adjacent projection images in horizontal direction cannot be smaller than the minimum overlapping level 10% and another overlapping ratio between two adjacent projection images in vertical direction has to be equal to 20%. It should be noted that the minimum overlapping levels in horizontal and vertical directions may be system defaults or set by the user according to practical applications. Accordingly, when the height of the projection plane is 2 m and the minimum overlapping level between two adjacent projection images in vertical direction is 20%, the height of the projection image of one projector is 1.11 m, wherein the height of the projection image of one projector is the aforesaid projection length. Furthermore, since the target aspect ratio is 4:3, the width of the projection image of one projector is 0.83 m. When the width of the projection plane is 6.4 m, the number of projectors required by "two layers side-by-side portrait projection blending" is 9*2. At this time, the overlapping ratio between two adjacent projection images in horizontal direction is 16.5% (i.e. 9*0.83 m−0.83 m*16.5%*8=6.4 m). Furthermore, the target throw ratio is a ratio of the projection distance (i.e. 3 m) to the height of the projection image of one projector (i.e. the aforesaid projection length 1.11 m). Accordingly, the target throw ratio is 2.7. In this embodiment, the predetermined brightness level may be 3 times the environmental brightness. It should be noted that the predetermined brightness level may be a system default or set by the user according to practical applications. Accordingly, the target minimum projection brightness may be a product of 3 times the environmental brightness (i.e. 300 lux*3) and a projection area of one projector (i.e. 1.1111 m*0.8333 m=0.925 $m^2$), i.e. the target minimum projection brightness is 833 lumen (i.e. 900 lux*0.925 $m^2$=833 lumen).

TABLE 2

| | One layer side-by-side landscape projection blending | | | | |
|---|---|---|---|---|---|
| Target resolution | Number of projectors | Overlapping ratio between two adjacent projection images in horizontal direction | Target minimum projection brightness (lumen) | Target throw ratio | Width (m) and height (m) of the projection image of one projector |
| XGA | 3 | 30% | 4800 | 1.13 | Width: 2.67 Height: 2 |
| WUXGA/WXGA | 3 | 50% | 5760 | 0.94 | Width: 3.2 Height: 2 |
| 4K/1080p | 2 | 20% | 6400 | 0.84 | Width: 3.56 Height: 2 |

Two Layers Side-by-Side Portrait Projection Blending:
In the following, a projector with a target resolution XGA (i.e. target resolution is 1024*768 and aspect ratio is 4:3) is exemplified. First, the processing unit 14 sets a height of two projection images of two projectors in vertical direction to be equal to the height (i.e. 2 m) of the projection plane and then blends a plurality of projectors according to the width (i.e. 6.4 m) of the projection plane. In this embodiment, the invention may preset a minimum overlapping level between two adjacent projection images in horizontal direction to be 10% and preset another minimum overlapping level between two adjacent projection images in vertical direction to be When the target resolution is WUXGA, WXGA, 4K, or 1080p, the processing unit 14 may also calculate the height and width of the projection image of one projector, the number of projectors, the overlapping ratio between two adjacent projection images in horizontal direction, the target throw ratio and the target minimum projection brightness correspondingly according to the aforesaid manner. As shown in table 3 below, table 3 records a plurality of calculation results corresponding to different target resolutions.

TABLE 3

Two layers side-by-side portrait projection blending

| Target resolution | Number of projectors | Overlapping ratio between two adjacent projection images in horizontal direction | Target minimum projection brightness (lumen) | Target throw ratio | Width (m) and height (m) of the projection image of one projector |
|---|---|---|---|---|---|
| XGA | 18 | 16.5% | 833 | 2.7 | Width: 0.83 Height: 1.11 |
| WUXGA/WXGA | 22 | 17.8% | 694 | 2.7 | Width: 0.69 Height: 1.11 |
| 4K/1080p | 24 | 16% | 625 | 2.7 | Width: 0.63 Height: 1.11 |

It should be noted that the calculation principles of "one layer side-by-side portrait projection blending" and "two layers side-by-side landscape projection blending" is essentially identical to the calculation principles of "one layer side-by-side landscape projection blending" and "two layers side-by-side portrait projection blending", so the repeated explanation will not be depicted herein again.

Then, the processing unit 14 may generate a projector recommendation result according to the target minimum projection brightness, the target throw ratio, the target resolution corresponding to the target aspect ratio and the projection parameters of each of the projectors mentioned in the above (step S16 in FIG. 2). The display unit 16 is configured to display the projector recommendation result.

In this embodiment, the processing unit 14 may determine whether the projection parameters of each of the projectors satisfy the target minimum projection brightness, the target throw ratio and the target resolution. When the projection parameters of at least one candidate projector of the projectors satisfy the target minimum projection brightness, the target throw ratio and the target resolution, the processing unit 14 may generate a projector recommendation list to be the projector recommendation result, wherein the projector recommendation list shows the at least one candidate projector. In this embodiment, the resolution of the candidate projector has to be identical to the target resolution, the minimum projection brightness of the candidate projector has to be larger than or equal to the target minimum projection brightness, and the throw ratio of the candidate projector has to cover the target throw ratio. In this embodiment, when the candidate projector comprises a plurality of lenses, the processing unit 14 may further select at least one candidate lens from the lenses of the candidate projector according to the target throw ratio and the projector recommendation list may further show the at least one candidate lens.

As shown in tables 1 and 2, for one layer side-by-side landscape projection blending, the projector P4 satisfies the aforesaid projection requirement. Accordingly, the projector P4 is the candidate projector of one layer side-by-side landscape projection blending. As shown in tables 1 and 3, the lens L1 of the projector P6 satisfies the aforesaid projection requirement. Accordingly, the projector P6 is the candidate projector of two layers side-by-side portrait projection blending and the lens L1 is the candidate lens. Accordingly, as shown in FIG. 5, the projector recommendation list shows the projector P4, the projector P6 and the lens L1 for the user. Furthermore, the projector recommendation list may further show the required number of the projectors P4, P6 for the user.

On the other hand, when the projection parameters of all of the projectors do not satisfy the target minimum projection brightness, the target throw ratio and the target resolution, the processing unit 14 may generate a notice message to be the projector recommendation result. For example, the notice message may show that no projector satisfies the projection requirement or the like. At this time, the user may adjust the projection requirement according to the notice message or a system administrator may add other projector(s) into the database, such that the projector recommendation system 1 may recommend an appropriate projector again.

As mentioned in the above, when a user wants to install a projector at a site, the user needs to input the size of the projection plane, the projection distance and the environmental brightness. Then, the invention will generate the corresponding projector recommendation result automatically. When there is/are projector(s) in the database satisfying the projection requirement, the invention may generate a projector recommendation list including at least one candidate projector for the user. Accordingly, the user may find a projector satisfying the projection requirement rapidly through the projector recommendation list. On the other hand, when there is no projector in the database satisfying the projection requirement, the invention may generate a notice message to notice the user that there is no projector satisfying the projection requirement. At this time, the user may adjust the projection requirement according to the notice message or a system administrator may add other projector(s) into the database, such that the projector recommendation system may recommend an appropriate projector again. Accordingly, the invention can improve the installation of projector more efficient and more convenient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector recommendation method comprising:
a database providing a look-up table, wherein the look-up table records a plurality of projectors and a plurality of projection parameters corresponding to each of the projectors;
an input interface inputting a size of a projection plane, a projection distance and an environmental brightness;
a processing unit calculating a projection length according to the size of the projection plane, a target aspect ratio and a blending manner, calculating a target throw ratio according to the projection distance and the projection length, and calculating a target minimum projection brightness according to the environmental brightness, a predetermined brightness level and a projection area;

the processing unit generating a projector recommendation result according to the target minimum projection brightness, the target throw ratio, a target resolution corresponding to the target aspect ratio and the projection parameters; and the processing unit generating a projector recommendation list to be the projector recommendation result when the projection parameters of at least one candidate projector of the projectors satisfy the target minimum projection brightness, the target throw ratio and the target resolution, wherein a display unit displays the projector recommendation list to show the at least one candidate projector for installing a projector satisfying a projection requirement at a site.

2. The projector recommendation method of claim 1, further comprising:

the processing unit calculating a number of projectors corresponding to the target resolution according to the size of the projection plane, the target aspect ratio, the blending manner and at least one minimum overlapping level, wherein the projector recommendation list shows the number of projectors.

3. The projector recommendation method of claim 1, wherein the at least one candidate projector comprises a plurality of lenses, the processing unit selects at least one candidate lens from the lenses according to the target throw ratio, and the projector recommendation list shows the at least one candidate lens.

4. The projector recommendation method of claim 1, further comprising:

when the projection parameters of all of the projectors do not satisfy the target minimum projection brightness, the target throw ratio and the target resolution, the processing unit generating a notice message to be the projector recommendation result.

5. The projector recommendation method of claim 1, wherein the projection parameters comprise a throw ratio, a resolution, an aspect ratio and a minimum projection brightness of each of the projectors.

6. The projector recommendation method of claim 5, wherein at least one of the projectors comprises a plurality of lenses and the look-up table records the throw ratio of each of the lenses.

7. The projector recommendation method of claim 1, wherein the blending manner is at least one layer side-by-side landscape projection blending or at least one layer side-by-side portrait projection blending.

8. A projector recommendation system comprising:

a database storing a look-up table, the look-up table recording a plurality of projectors and a plurality of projection parameters corresponding to each of the projectors;

an input interface configured to input a size of a projection plane, a projection distance and an environmental brightness;

a processing unit calculating a projection length according to the size of the projection plane, a target aspect ratio and a blending manner, calculating a target throw ratio according to the projection distance and the projection length, and calculating a target minimum projection brightness according to the environmental brightness, a predetermined brightness level and a projection area, the processing unit generating a projector recommendation result according to the target minimum projection brightness, the target throw ratio, a target resolution corresponding to the target aspect ratio and the projection parameters, wherein when the projection parameters of at least one candidate projector of the projectors satisfy the target minimum projection brightness, the target throw ratio and the target resolution, the processing unit generates a projector recommendation list to be the projector recommendation result, and the projector recommendation list shows the at least one candidate projector; and a display unit configured to display the projector recommendation list to show the at least one candidate projector for installing a projector satisfying a projection requirement at a site.

9. The projector recommendation system of claim 8, wherein the processing unit calculates a number of projectors corresponding to the target resolution according to the size of the projection plane, the target aspect ratio, the blending manner and at least one minimum overlapping level, and the projector recommendation list shows the number of projectors.

10. The projector recommendation system of claim 8, wherein the at least one candidate projector comprises a plurality of lenses, the processing unit selects at least one candidate lens from the lenses according to the target throw ratio, and the projector recommendation list shows the at least one candidate lens.

11. The projector recommendation system of claim 8, wherein when the projection parameters of all of the projectors do not satisfy the target minimum projection brightness, the target throw ratio and the target resolution, the processing unit generates a notice message to be the projector recommendation result.

12. The projector recommendation system of claim 8, wherein the projection parameters comprise a throw ratio, a resolution, an aspect ratio and a minimum projection brightness of each of the projectors.

13. The projector recommendation system of claim 12, wherein at least one of the projectors comprises a plurality of lenses and the look-up table records the throw ratio of each of the lenses.

14. The projector recommendation system of claim 8, wherein the blending manner is at least one layer side-by-side landscape projection blending or at least one layer side-by-side portrait projection blending.

* * * * *